US011237343B2

(12) United States Patent
Goddard et al.

(10) Patent No.: US 11,237,343 B2
(45) Date of Patent: Feb. 1, 2022

(54) VOLUMETRIC OPTICAL INTEGRATED CIRCUITS

(71) Applicant: The Board of Trustees of the University of Illinois, Urbana, IL (US)

(72) Inventors: Lynford L. Goddard, Champaign, IL (US); Kimani C. Toussaint, Providence, RI (US); Paul V. Braun, Champaign, IL (US); Jinlong Zhu, Urbana, IL (US); Daniel Bacon-Brown, Orem, UT (US); Christian H. Ocier, Urbana, IL (US); Qing Ding, Urbana, IL (US); Corey Richards, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 16/706,173

(22) Filed: Dec. 6, 2019

(65) Prior Publication Data

US 2020/0183100 A1    Jun. 11, 2020

Related U.S. Application Data

(60) Provisional application No. 62/784,427, filed on Dec. 22, 2018, provisional application No. 62/776,636, filed on Dec. 7, 2018, provisional application No. 62/944,554, filed on Dec. 6, 2019.

(51) Int. Cl.
*G02B 6/12* (2006.01)
*C08F 2/48* (2006.01)
*G02B 6/42* (2006.01)

(52) U.S. Cl.
CPC .......... *G02B 6/4212* (2013.01); *C08F 2/48* (2013.01); *G02B 6/12* (2013.01); *G02B 2006/1219* (2013.01)

(58) Field of Classification Search
None
See application file for complete search history.

(56) References Cited

U.S. PATENT DOCUMENTS 5,761,111 A * 6/1998 Glezer ................. G11B 7/0045
                                                      365/106
8,320,727 B1 * 11/2012 Jacobsen ............... F28D 20/023
                                                      385/129
8,670,476 B2    3/2014 Goddard et al.
(Continued)

OTHER PUBLICATIONS

A. Pasko, T. Vilbrandt, O. Fryazinov and V. Adzhiev, "Procedural Function-Based Spatial Microstructures," 2010 Shape Modeling International Conference, 2010, pp. 47-56, doi: 10.1109/SMI.2010. 19. (Year: 2010).*

(Continued)

*Primary Examiner* — Rhonda S Peace
(74) *Attorney, Agent, or Firm* — Crowell & Moring LLP

(57) ABSTRACT

A device includes an optic in an at least partially rigid scaffold. The scaffold is permeated, at least temporarily during a writing process, by writable media. The optic may be written into a writable volume in the scaffold defined by the writable media. The optic may be written by exposing the writable media to incident light to cause a material property change in the writable media within the writable volume.

20 Claims, 4 Drawing Sheets

(56) References Cited

U.S. PATENT DOCUMENTS

| | | | | |
|---|---|---|---|---|
| 8,895,233 | B2* | 11/2014 | McLeod | G03F 7/2053 |
| | | | | 430/321 |
| 9,255,791 | B2 | 2/2016 | Popescu et al. | |
| 9,404,857 | B2 | 8/2016 | Popescu et al. | |
| 10,192,471 | B2* | 1/2019 | Gracias | G09G 3/003 |
| 10,228,653 | B2* | 3/2019 | Ochiai | G02B 3/14 |
| 10,239,255 | B2* | 3/2019 | Talken | C08F 290/067 |
| 2004/0227694 | A1* | 11/2004 | Sun | H04N 13/39 |
| | | | | 345/6 |
| 2009/0218519 | A1* | 9/2009 | McLeod | G03F 7/70416 |
| | | | | 250/492.1 |
| 2012/0063484 | A1 | 3/2012 | Goddard et al. | |
| 2013/0209921 | A1* | 8/2013 | Qiu | G03F 7/0757 |
| | | | | 430/5 |
| 2014/0072806 | A1* | 3/2014 | Allen | B32B 17/10733 |
| | | | | 428/415 |
| 2015/0355379 | A1* | 12/2015 | Wolter | G03F 7/0002 |
| | | | | 428/195.1 |
| 2016/0118265 | A1 | 4/2016 | Goddard et al. | |
| 2018/0301344 | A1 | 10/2018 | Goddard et al. | |
| 2019/0275746 | A1* | 9/2019 | Huang | B29C 64/00 |
| 2020/0183100 | A1* | 6/2020 | Goddard | C08F 2/48 |

OTHER PUBLICATIONS

Ambekar, R., Lau, T.-Y., Walsh, M., Bhargava, R., and Toussaint, K. C., "Quantifying collagen structure in breast biopsies using second-harmonic generation imaging," *Biomed. Opt. Express*, vol. 3, No. 9,2012, pp. 2021-2035.

Arbabi, A. and Goddard, L. L., "Dynamics of Self-Heating in Microring Resonators," *IEEE Photonics J.*, vol. 4, No. 5, 2012, pp. 1702-1711.

Arbabi, A., Kang, Y. M., Lu, C.-Y., Chow, E., and Goddard, L. L., "Realization of a narrowband single wavelength microring mirror," *Appl. Phys. Lett.*, vol. 99, No. 9, 2011, 091105, pp. 1-3.

Cattin, C. J., Düggelin, M., Martinez-Martin, D. et al., "Mechanical control of mitotic progression in single animal cells", *Proc. Nation. Acad. Sci*, vol. 112, No. 36, 2015, 6 pgs.

Chaudhuri, O., Gu, L., Darnell. M. et al., "Substrate stress relaxation regulates cell spreading", *Nat. Commun*, vol. 6, 2015, 7 pgs.

Chen, S., Cheng, J., Kong. C. et al., "Laser-induced fusion of human embryonic stem cells with optical tweezers", *Appl. Phys. Lett.* vol. 103, No. 033701, 2013, 5 pgs.

Gao, Y., Cansizoglu, H., Polat, K. G. et al., "Photon-trapping microstructures enable high-speed high-efficiency silicon photodiodes," *Nat. Photonics*, vol. 11, No. 5, 2017, pp. 301-308.

Hotz, M. and Nelson, W. J., "Pumilio-dependent localization of mRNAs at the cell front coordinates multiple pathways required for chemotaxis", *Nat. Commun.*, vol. 8, 2017, 9 pgs.

Suresh, S., Spatz, J., Mills, J.P., et al., "Connections between single-cell biomechanics and human disease states: gastrointestinal cancer and malaria", *Acta Biomaterialia*, vol. 23, 2015, S3-S15.

Zhou, R., Edwards, C., Arbabi, A., et al., "Detecting 20 nm Wide Defects in Large Area Nanopatterns Using Optical Interferometric Microscopy", *Nano Lett.*, vol. 13, 2013, pp. 3716-3721.

Zhu, J. and Goddard, L. L., "Spatial control of photonic nanojets", *Opt. Express*, vol. 24, No., 2016, 21 pgs.

Almeida et al., "All-optical control of light on a silicon chip," *Nature*, 431 (2004) pp. 1081-1084.

Ambekar et al., "Investigation of Collagen Fiber Organization in Cornea and Sclera using Quantitative SHG Microscopy," presented at the Frontiers in Optics 2011—Laser Science XXVII, San Jose, CA, 2011, FTuQ2 (1-2).

Ambekar et al., "Quantitative second-harmonic generation microscopy for imaging porcine cortical bone: Comparison to SEM and its potential to investigate age-related changes," *Bone*, 50 (2012) pp. 643-650.

Ambekara et al., "The Effect of Keratoconus on the Structural, Mechanical, and Optical Properties of the Cornea," *Journal of the Mechanical Behavior of Biomedical Material*, 4 (2011) pp. 223-236.

Arbabi et al., "Determination of Waveguide Core and Cladding Refractive Indices using Single Wavelength Microring Reflectors,", presented at the Photonics Conference (IPC), 2012 IEEE, Burlingame, CA, USA, 2012, pp. 254-255.

Arbabi et al., "Grating integrated single mode microring laser," *Optical Society of America* (2015) pp. 5335-5347.

Arbabi et al., "Realization of small footprint microring reflectors," in *CLEO:2011—Laser Applications to Photonic Applications*, Baltimore, MD, 2011, JTuI25, pp. 1-2.

Arbabi et al., "An Active-Passive Monolithic Integration Platform with Low Loss Passive Section," *IEEE Xplore* (2013) pp. 1-2.

Arbabi et al., "Grating Assisted Mode Coupling in Microring Resonator," *IEEE Xplore* (2013) pp. 111-112.

Arbabi et al., "Hybrid whispering gallery mode/plasmonic chain ring resonators for biosensing," *Appl. Phys. Lett.* 105, 231107 (2014) pp. 1-5.

Arbabi et al., Integrated Optical Resonators: Progress in 2011, *IEEE Photonics Journal*, 4:2 (2012) pp. 574-577.

Arbabi et al., "Measurements of the refractive indices and thermo-optic coefficients of Si3N4 and SiOx using microring resonances," *Optics Letters*, 38:19 ( 2013) pp. 3878-3881.

Arbabi et al., "Single Wavelength Microring Laser," *CLEO: Technical Digest* © *OSA* (2013) pp. 1-2.

Asghari et al., "Energy-efficient communication," *Nature Photonics*, 5 (2011) pp. 268-270, www.nature.com/naturephotonics.

Astrova et al., "Effective refractive index and composition of oxidized porous," *Materials Science and Engineering*, B69-70 (2000) pp. 142-148.

Beresna et al., "Ultrafast laser direct writing and nanostructuring in transparent materials," *Advances in Optics and Photonics*, 6 (2014) pp. 293-339.

Bhaduri et al., "Diffraction phase microscopy: principles and applications in materials and life sciences," *Advances in Optics and Photonics*, 6, (2014) pp. 57-119.

Chartier et al., "Graded-index surface or buried waveguides by ion exchange in glass," *Applied Optics* 19:7 (1980) pp. 1092-1095.

Crespi et al., "Integrated photonic quantum gates for polarization qubits," *Nature Communications* (2011) pp. 1-6.

Cullis et al., "The Structural and luminescence properties of porous silicon," *Journal of Applied Physics*, 82 (1997) pp. 1-58.

Davoudzadeh et al., "Thermal Nonlinearity Based Optical Pulse Generation in Microrings," *2016 Progress in Electromagnetic Research Symposium (PIERS)*, Aug. 8-11, 2016 1 pg. Shanghai, China.

Edwards et al., "Characterizing microdroplet evaporation using diffraction phase microscopy," *IEEE Xplore* (2014) pp. 178-179.

Edwards et al., "Diffraction phase microscopy: monitoring nanoscale dynamics in materials science [Invited]," *Optical Society of America*, 53:27 (2014) pp. G33-G43.

Edwards et al., "Digital projection photochemical etching defines gray-scale features," *Optics Express*, 21:11 (2013) pp. 13547-13554.

Edwards et al., "Effects of spatial coherence in diffraction phase microscopy," *Optics Express*, 22:5 (2014) pp. 5133-5146.

Edwards et al., "Epi-illumination diffraction phase microscopy with white light," *Optics Letters*, 39:21 (2014) pp. 6162-6165.

Edwards et al., "Fabrication of Diffractive Optical Elements with Digital Projection Photochemical Etching," *CLEO* (2014) pp. 1-2.

Edwards et al., "Image Formation and Halo Removal in Diffraction Phase Microscopy with Partially Coherent Illumination," *FiO/LS* (2014) pp. 1-2.

Edwards et al., "In situ measurements of the axial expansion of palladium microdisks during hydrogen exposure using diffraction phase microscopy," *Optical Materials Express*, 4:12 (2014) pp. 2559-2564.

Edwards et al., "In-situ measurements of nanoscale phenomena using diffraction phase Microscopy," *Proc. of SPIE*, 9336 (2015) pp. 1-9.

Edwards et al., "Measuring the Nonuniform Evaporation Dynamics of Sprayed Sessile Microdroplets with Quantitative Phase Imaging," *Langmuir*, 31 (2015) pp. 11020-11032.

Edwards et al., "Microfluidic Device Fabrication Utilizing Virtual Masks and Photochemical Etching," *Frontiers in Optics/Laser Science* (2015) pp. 1-2.

(56) References Cited

OTHER PUBLICATIONS

Edwards et al., "Modeling of Compact Pd Coated VCSELs for Hydrogen Sensing," *Proc. of SPIE*, 7952 (2011) pp. 79520E-1-10.
Edwards et al., "Observing hydrogen induced deformations in palladium thin-films," *IEEE Xplore* (2013) pp. 612-613.
Edwards et al., "Optically monitoring and controlling nanoscale topography during semiconductor etching," *Light: Science & Applications* (2012) pp. 1-7.
Edwards et al., "Phase correction in low coherence diffraction phase microscopy using the optical transfer function," *Proc. of SPIE*, 9336 (2015) pp. 1-6.
Edwards et al., Reflection-based Diffraction Phase Microscopy using Broadband Illumination,: *FiO/LS* (2014) pp. 1-2.
Emma et al., "Is 3D chip technology the next growth engine for performance improvement?," *IBM J. Res. & Dev.*, 52:6 ( 2008) pp. 541-552.
Fischer et al., "The Materials Challenge in Diffraction-Unlimited Direct-Laser-Writing Optical Lithography," *Adv. Mater.* 22 (2010) pp. 3578-3582.
Gissibl et al., "Two-photon direct laser writing of ultracompact multi-lens objectives," *Nature Photonics* 10 (2016) pp. 554-560.
Griffin et al., Edge Emitting Sensors for Accurate Quantification of Hydrogen Composition Above 0.5%, *OSA/ CLEO* (2011) pp. 1-2.
Griffin et al., "Engineering the Sensitivity and Response Time of Edge-Emitting Laser Hydrogen Sensors," *IEEE Sensors Journal*, 13:8 (2013) pp. 3098-3105.
Griffin et al., "Demonstration of enhanced side-mode suppression in metal-filled photonic crystal vertical cavity lasers," *Optics Letters* 38:11 (2013) pp. 1936-1938.
Griffin et al., "Functionalized Distributed Feedback Lasers for Hydrogen Sensing Applications," *IEEE Xplore*, pp. 610-611.
Griffin et al., "Hydrogen Detection Using a Functionalized Photonic Crystal Vertical Cavity Laser," *IEEE Journal of Quantum Electronics*, 48:2 (2012) pp. 160-168.
Griffin et al., "Palladium-Coated Photonic Crystal Vertical Cavity Lasers for Hydrogen Sensing Applications," *IEEE Xplore*, pp. 373-374.
Griffin et al., "Pd Coated Edge-Emitting Lasers for Hydrogen Sensing Applications," *IEEE Sensors 2010 Conference, IEEE Xplore*, pp. 1710-1713.
Guan et al., "Free-space coherent optical communication with orbital angular, momentum multiplexing/demultiplexing using a hybrid 3D photonic integrated circuit," *Optics Express*, 22:1 (2014) pp. 145-156.
Heck et al., "Hybrid Silicon Photonic Integrated Circuit Technology," *IEEE Journal of Selected Topics in Quantum Electronics*, 19:4 (2013) pp. 1-17.
Hill et al., "Advances in small lasers," *Nature Photonics* 8 (2014) pp. 908-918.
Hwang et al., "Dissolution Chemistry and Biocompatibility of Single-Crystalline SiliconNanomembranes andAssociated Materials for Transient Electronics," *ACS NANO*, 8:6 (2014) pp. 5843-5851.
Ilyas et al., "Graded refractive index devices from porous silicon," *IEEE Xplore* (2006) pp. 427-430.
Kabir et al., "Application of quantitative second-harmonic generation microscopy to dynamic conditions," *Biomedical Optics Express* 4:11 (2013) pp. 2546-2554.
Kabir et al., "GPU-Based Quantitative Second-Harmonic Generation Imaging," *Classical Optics* (2014) pp. 1-3.
Kabir et al., "Graphics processing unit-based quantitative second-harmonic generation imaging," *Journal of Biomedical Optics* 19(9), (Sep. 2014) pp. 1-9.
Kai et al., "Force Matters: Biomechanical Regulation of Cell Invasion and Migration in Disease," *Trends in Cell Biology*, 26:7 (2016) pp. 486-497.
Kamali et al., "A Zeroth-Order Modification of Coupled Mode Theory for Waveguide Gratings," *IEEE Photonics Technology Letters*, 27:7 (2015) pp. 790-793.
Kamali et al., "The unperturbed structure in the coupled mode theory of waveguide gratings," *IEEE Xplore* (2020) pp. 611-612.
Kang et al., "Modal Expansion Approach for Accurately Computing Resonant Modes in a High-Q Optical Resonator," *Microwave and Optical Technology Letters*, 56:2, (2014) pp. 278-284.
Kang et al., "A microring resonator with an integrated Bragg grating: a compact replacement for a sampled grating distributed Bragg reflector," *Opt Quant Electron*, 41 (2009) pp. 689-697.
Khurgin et al., "Comparative analysis of spasers, vertical-cavity surface-emitting lasers and surface-plasmon-emitting diodes," *Nature Photonics*, 8 (2014) pp. 468-473.
Khurgin et al., "How to deal with the loss in plasmonics and metamaterials," *Nature Nanotechnology* 10 (2015) pp. 1-5.
Kim et al., "Breakthroughs in Photonics 2013: Quantitative Phase Imaging: Metrology Meets Biology," *IEEE Photonics Journal*, 6:2 (2014) pp. 1-10.
Kim et al., "Deterministic signal associated with a random field," *Optics Express*, 21:18 (2013) pp. 1-15.
Kim et al., "Quantitative phase imaging with programmable illumination," *Proc. of SPIE*, 9336 (2020) pp. 1-9.
Kim et al., "Spatial light interference microscopy with programmable illumination patterns," *Biomedical Optics* (2014) BT3A.22 pp. 1-3.
Kim et al., "White-light Diffraction Tomography (WDT) of Live Cells," *Biomedical Optics* (2014) BM4B.6 pp. 1-3.
Kim et al., "White-light diffraction tomography of unlabeled live cells," *Nature Photonics* 8 (2014) pp. 256-263.
Kim et al., "Solving inverse scattering problems in biological samples by quantitative phase imaging," *Laser Photonics* Rev. 10:1 (2016) pp. 13-39.
Kimerling et al., "Electronic-photonic integrated circuits on the CMOS platform," *Proc. of SPIE*, 6125 (2006) pp. 1-11.
Kirita et al., "Vertical MMI Coupler for 3D Photonic Integrated Circuits," *IEEE Xplore* (2020) pp. 477-478.
Krueger et al., "Porous Silicon Gradient Refractive Index Micro-Optics," *Nano Lett.*, 16 (2016) pp. 7402-7407.
Lau et al., "Quantification of collagen fiber organization using three-dimensional Fourier transform-second-harmonic generation imaging," *Optics Express*, 20:19 (2012) pp. 1-12.
Lau et al., "Quantitative metrics for SHG imaging of collagen-based biological structures," *Optics in the Life Sciences Congress Technical Digest* (2013).
Lau et al., "Quantification of Rat Cervical Microstructure using Fourier Transform-Second-Harmonic Generation Imaging," *Technical Digest* (2013) pp. 1-2.
Lau et al., "Real-time Fourier Transform-Second-Harmonic Generation Imaging of Collagen-based Biological Tissues," *Imaging and Applied Optics* (2013) pp. 1-3.
Lau et al., "Three-Dimensional Fourier-Transform Second-Harmonic Generation Microscopy for Quantification of Collagen Fiber Organization in Biological Tissues," *FiO/LS Technical Digest* (2012) pp. 1-2.
Lee et al., "Rapid Covalent Modification of Silicon Oxide Surfaces through Microwave-Assisted Reactions with Alcohols," *Langmuir* 32 (2016) pp. 7284-7293.
Levy et al., "CMOS-compatible multiple-wavelength oscillator for on-chip optical interconnects," *Nature Photonics* 4 (2010) pp. 37-40.
Lipson, "Guiding, Modulating, and Emitting Light on Silicon—Challenges and Opportunities," *Journal of Lightwave Technology*, 23:12 (2005) pp. 4222-4238.
Lockwood et al., "Silicon Fundamentals for Photonics Applications," *Appl. Phys.*, 94, (2004) pp. 1-52.
Marconi et al., "Vectorial dissipative solitons in vertical-cavity surface-emitting lasers with delays," *Nature Photonics* 9 (2015) pp. 450-455.
Marshall et al., "Laser written waveguide photonic quantum circuits," *Optics Express*, 17:15 (2009) pp. 12546-12554.
McKeown et al., "Fiber Optic Hydrogen Sensor Utilizing Facet-Etched Metal Nano-apertures," *IEEE Xplore* (2010) pp. 730-731.
McKeown et al., "Hydrogen Detection Using Polarization Diversity via a Subwavelength Fiber Aperture," *IEEE Photonics Journal*, 4:5 (2012) pp. 1752-1761.

(56) References Cited

OTHER PUBLICATIONS

McKeown et al., "Realization of palladium-based optomechanical cantilever hydrogen sensor," *Microsystems & Nanoengineering* 3 (2017) pp. 1-6.
McKeown et al., "Reflective Palladium Nanoapertures on Fiber for Wide Dynamic Range Hydrogen Sensing," *IEEE Journal of Selected Topics in Quantum Electronics*, 23:2 (2017) pp. 263-268.
Miwa et al., "Femtosecond two-photon stereo-lithography," *Appl. Phys. A* 73, (2001) pp. 561-566.
Nasu et al., "Low-loss waveguides written with a femtosecond laser for flexible interconnection in a planar light-wave circuit," *Optics Letters*, 30:7 (2005) pp. 723-725.
Nejadmalayeri et al., "Inscription of optical waveguides in crystalline silicon by mid-infrared femtosecond laser pulses," *Optics Letters*, 30:9 (2005) pp. 964-966.
Nguyen et al., "Halo-free quantitative phase imaging with partially coherent light," *Proc. of SPIE*, 9336 (2015) 93360N-1-5.
Nguyen et al., "Quantitative phase-shifting DIC using programmable spatial light modulators," *Proc. of SPIE*, 9336 (2015) pp. 93360P-1-5.
Nguyen et al., "Quantitative phase imaging of weakly scattering objects using partially coherent illumination," *Optics Letters*, 24:11 (2016) pp. 11683-11693.
Nguyen et al., "Quantitative phase imaging with partially coherent illumination," *Optics Letters*, 39:19 (2014) pp. 5511-5514.
Ning et al., "Transfer-Printing of Tunable Porous Silicon Microcavities with Embedded Emitters," *ACS Photonics* 1 (2014) pp. 1144-1150.
Ocier et al., "Tunable Visibly Transparent Optics Derived from Porous Silicon," *ACS Photonics* 4 (2017) pp. 909-914.
Owens et al., "Two-proton quantum walks in an elliptical direct-write waveguide array," *New Journal of Physics* 13 (2011) pp. 1-14.
Park et al., "Hybrid silicon evanescent laser fabricated with a silicon waveguide and III-V offset quantum wells," *Optics Express*, 13:23 (2005) pp. 9460-9464.
Pham et al., "Fast phase reconstruction in white light diffraction phase microscopy," *Applied Optics*, 52:1 (2013) pp. A97-A101.
Rajshekhar et al., "Wide-field diffraction phase microscope for precision metrology," *Imaging and Applied Optics* (2014) OSA pp. 1-3.
Rajshekhar et al., "Nanoscale topography and spatial light modulator characterization using wide-field quantitative phase imaging," *Optics Express*, 22:3 (2014) pp. 3432-3438.
Rao et al., "Comparison of forward and backward SHG images using Fourier transform-second-harmonic generation imaging," presented at the Conference on Lasers and Electro-Optics 2010, San Jose, CA, 2010, JWA 67 (1-2).
Rao et al., "Fourier transform-second-harmonic generation imaging of biological tissues," *Optics Express*, 17:17 (2009) pp. 14534-14542.
Ambekar, R., Mehta, M. R., Leithem, S., and Toussaint, Jr, K. C., "Fourier Transform-Second-Harmonic Generation Imaging of Collagen Fibers in Biological Tissues," presented at the Biomedical Optics 2010, Miami, FL, 2010, BSuD63 (1-2).
Rao et al., "Quantitative analysis of biological tissues using Fourier transformsecond-harmonic generation imaging," *Proc. of SPIE*, 7569 (2020) pp. 1-10.
Rao et al., "Quantitative analysis of forward and backward second-harmonic images of collagen fibers using Fourier transform second-harmonic-generation microscopy," *Optics Letters*, 34:24 (2009) pp. 3779-3781.
Raval et al., "Palladium Based Fabry-Pérot Etalons for Hydrogen Sensing," *Imaging and Applied Optics Technical Digest* (2012) pp. 1-3.
Rodriguez et al., "Porous silicon ring resonator for compact, high sensitivity biosensing applications," *Optics Express*, 23:6 (2015) pp. 7111-7119.
Roelkens et al., "III-V/silicon photonics for on-chip and inter-chip optical interconnects," *Laser Photonics Rev.* 4:6, (2010) pp. 751-779.
Roxworthy et al., "Application of Plasmonic Bowtie Nanoantenna Arrays for Optical Trapping, Stacking, and Sorting," *Nano Letters*, 12 (2012) pp. 796-801.
Rudolph, "Why I am optimistic about the silicon-photonic route to quantum computing," *APL Photonics*, 2, (2017) pp. 1-20.
Sherwood-Droz et al., "Scalable 3D dense integration of photonics on bulk silicon," *Optics Express*, 19:18 (2011) pp. 17758-17765.
Sailor, M. J., *Porous Silicon in Practice: Preparation, Characterization and Applications*. Weinheim, Germany: Wiley-VCH Verlag GmbH & Co. KGaA, 2011. Description of eBook only.
Shin et al., "Thermally Functional Liquid Crystal Networks by Magnetic Field Driven Molecular Orientation," *ACS Macro Letters*, 5 (2016) pp. 955-960.
Sivaguru et al., "Quantitative analysis of collagen fiber organization in injured tendons using Fourier transform-second harmonic generation imaging," *Optics Express*, 18:24 (2010) pp. 24983-24993.
Sugioka et al., "Femtosecond laser processing for optofluidic fabrication," *Lab Chip*, 12 (2012) pp. 3576-3589.
Thomson et al., "Roadmap on silicon photonics," *Journal of Optics*, 18 (2016) pp. 1-21.
Tokel et al., "In-chip microstructures and photonic devices fabricated by nonlinear laser lithography deep inside silicon," *Nature Photonics*, 11 (2017) pp. 639-645.
Urness et al., "Arbitrary GRIN component fabrication in optically driven diffusive photopolymers," *Optics Express*, 23:1 (2014) pp. 264-273.
Wang et al., "Diffraction phase microscopy imaging and multiphysics modeling of the nanoscale thermal expansion of a suspended resistor," *Scientific Reports*, (2017) pp. 1-9.
Wang et al., "Fabrication of Gray-Scale Semiconductor Structures with Dynamic Digital Projection Photochemical Etching," *CLEO*, (2015) pp. 1-2.
Wang et al., "Vertically Tapered Adiabatic Waveguide Mode Converters Fabricated with Digital Projection Photochemical Etching," *Frontiers in Optics/Laser Science* (2015) pp. 1-2.
Weiss et al., "Electrically tunable porous silicon active mirrors," *Phys. Stat. Sol.* (a) 197:2 (2003) pp. 556-560.
Xiao et al., "Diffractive Spectral-Splitting Optical Element Designed by Adjoint-Based Electromagnetic Optimization and Fabricated by Femtosecond 3D Direct Laser Writing," *ACS Photonics* 3 (2016) pp. 886-894
Xue et al., Fast and accurate finite element analysis of large-scale three-dimensional photonic devices with a robust domain decomposition method, *Optics Express*, 22:4 (2014) pp. 1-16.
Ye et al., "Review of silicon photonics: history and recent advances," *Journal of Modern Optics*, 60:16 (2013) pp. 1299-1320.
Yoo et al., "Heterogeneous 2D/3D photonic integrated microsystems," *Microsystems & Nanoengineering*, 2 (2016) pp. 1-9.
Yu et al., "Axial confinement in the monolithic integrated self-rolled-up vertical SiNx microring resonator on a ridge waveguide," *CLEO*, (2016) pp. 1-2.
Yu et al., "Monolithically integrated self-rolled-up tube based vertical coupler with planar waveguide—a new 3D photonic integration scheme," *Advanced Photonics* (2015) pp. 1-3.
Yu et al., "Enhanced axial confinement in a monolithically integrated self-rolled-up SiNx vertical microring photonic coupler," *Applied Physics Letters* 109 (2016) pp. 1-6.
Yu et al., "Monolithic integration of the self-folled-up vertical SiNx ring resonator and the ridge waveguide," *IEEE Xplore* (2015) pp. 486-487.
Yu et al., "Monolithic integration of vertical SiNx microrings on a ridge waveguide to achieve multi-channel photonic coupling," *CLEO*, (2017) pp. 1-2.
Yu et al., "Monolithically integrated self-rolled-up microtube-based vertical coupler for threedimensional photonic integration," *Appl. Phys. Lett.* 107 (2015) pp. 1-6.
Zeng et al., "Neuronal cell-type classification: challenges, opportunities and the path forward," *Nature Reviews, Neuroscience*, 18 (2017) pp. 530-546.
Zhou et al., "9nm node wafer defect inspection using visible light," *Proc. of SPIE*, 9050 (2014) pp. 1-8.
Zhou et al., "Semiconductor defect metrology using laser-based quantitative phase imaging," *Proc. of SPIE*, 9336 (2015) pp. 1-6.

(56) References Cited

OTHER PUBLICATIONS

Zhou et al., "White-light interferometric microscopy for wafer defect inspection," *Proc. of SPIE*, 9336 (2015) pp. 1-7.
Zhou et al., "22 nm node wafer inspection using diffraction phase microscopy and image post-processing," *Proc. of SPIE*, 8681 (2013) pp. 1-8.
Zhou et al., "9nm node wafer defect inspection using three-dimensional scanning, a 405nm diode laser, and a broadband source," *Proc. of SPIE*, 9424 (2015) pp. 1-8.
Zhou, R., Edwards, C., Popescu, G., and Goddard, L. L., "Diffraction phase microscopy for wafer inspection," presented at the Photonics Conference (IPC), Burlingame, CA, USA, 2012, pp. 644-645.
Zhou et al., "Finding defects in a 22 nm node wafer with visible light," CLEO *Technical Digest* (2013) pp. 1-2.
Zhou et al., "Inverse Scattering Solutions Using Holographic Data," Imaging and *Applied Optics* (2014) OSA pp. 1-3.
Zhou et al., "Solving the Scattering Inverse Problem in the Wavevector Space," *Biomedical Optics* (2014) pp. 1-3.
Zhu et al., "Application of measurement configuration optimization for accurate metrology of sub-wavelength dimensions in multilayer gratings using optical scatterometry," *Applied Optics*, 55:25 (2016) pp. 6844-6849.
Zhu et al., "Enhanced Parallel Bridge Defect Inspection Using a Metalens Assisted Off-Focus Scanning Imaging," *CLEO* (2017) pp. 1-2.
Zhu et al., "Optical Critical Dimension Metrology for the 7nm Node and Beyond Using a Near-Field Metalens," Frontiers of Characterization and Metrology for Nanoelectronics (2017) pp. 280-281.
Zukauskas et al., "Tuning the refractive index in 3D direct laser writing lithography: towards GRIN microoptics," *Laser Photonics Rev.*, 9:6 (2015) pp. 706-712.
Griffin, B., Arbabi, A., and Goddard, L. L., "Coupled Mode Analysis of a Distributed Bragg Reflector Laser for Hydrogen Detection," presented at the Optical Sensors 2012, Monterey, CA, 2012, STh1B.6 (1-2).
Kang, Y. M., Arbabi, A., and Goddard, L. L., "Resolving split resonant modes in microrings," presented at the Photonics Conference (IPC), Burlingame, CA, USA, 2012, pp. 828-829.
Kim, T., Zhou, R., Goddard, L. and Popescu, G. "Label-free 3D imaging using white-light diffraction tomography," presented at the Microscience Microscopy Congress 2014, Manchester, UK, 2014, 1-2.
Lorenzo, E., Oton, C. J., Capuj, N. E. et al., "Porous silicon-based rugate filters," *Appl. Opt.*, vol. 44, No. 26, 2005, pp. 5415-5421.
Arbabi, A., Lu, P. K., Griffin, B. and Goddard,L., "Thermally-induced nonlinearity and optical bistability in Si3N4 microring resonators," presented at the Conference on Lasers and Electro Optics (CLEO), San Jose, CA, 2012, vol. paper JW4A.90, 1-2.

Zhou, R., Kim, T., Goddard, L. L., and Popescu, G., "Inverse scattering solutions using low-coherence light," *Opt. Lett.*, vol. 39, No. 15, 2014, pp. 4494-4497.
Zhao, Y.Y., Zhang, Y. L., Zheng, M. L., Dong, X. et al., "Three-dimensional Luneburg lens at optical frequencies (Laser Photonics Rev. 10(4)/2016)," *Laser Photonics Rev.*, vol. 10, No. 4, 2016, pp. 665-672.
Goddard, L., "Harnessing Light," presented at the EU-US Frontiers of Engineering Symposium (invited by the US National Academy of Engineering), Espoo, Finland, 2016.
Goddard,L., "Optical inspection and metrology of advanced materials," presented at the EU-US Frontiers of Engineering Symposium (invited by the US National Academy of Engineering), Seattle, WA, 2014.
Goddard, L., Gillette, M, Lewis, J. et al., "Quantitative Phase Imaging," presented at the NSF-CBET Grantee Conference, Baltimore, MD, 2012, 1-2.
Goddard, L. and McKeown, S., "Sub-wavelength patterned fiber tips for hydrogen detection," presented at the 1st Annual World Congress of Nano Science and Technology (Nano S&T) (invited), Dalian, China, 2011, vol. track 1-3, paper 4, 1-2.
Amberkar, R. and Toussaint Jr., K. C., "Development of Quantitative Metrics for Second-Harmonic Generation Imaging of Collagen-Based Structures," presented at the Frontiers in Optics 2010, Rochester, NY, 2010, FTuF6 (1-2).
Edwards, C., Arbabi, A., McKeown, S. J. et al., "Optical inspection and metrology using diffraction phase microscopy," presented at the Surface Analysis Symposium, Urbana, IL, 2013, 1-2.
Kim, T., Edwards, C., Goddard, L., and Popescu, G. "Quantitative phase imaging using programmable illumination patterns," presented at the Microscience Microscopy Congress 2014, Manchester, UK, 2014.
Zhou, R., Edwards, C., Popescu, G., and Goddard, L., "9nm node wafer defect inspection using dark-field and 3D scanning optical microscopy," presented at the SRC-TECHCON Conference, Austin, TX, 2014, 1-2.
Zhou, R, Kim, T., Goddard, L. and Popescu, G., "Wavevector space calculations in the focal region: optical trapping, lens focusing, and the Gouy phase," presented at the SPIE Photonics West, San Francisco, CA, 2015, vol. paper 9336-76, 1-6.
Zhou, R., Popescu, G. and Goddard, L., "Diffraction phase microscopy and image post-processing for 22 nm node wafer defect inspection," presented at the SRC Tech Con, Austin, TX, 2013, vol. paper 13.3, 1-2.
Xin, Y., Arbabi, E., Goddard, L. L., Xiuling, L., and Xiaogang, C., "Monolithic integration of the self-rolled-up vertical SiNx ring resonator and the ridge waveguide," presented at the Photonics Conference (IPC), 2015, Reston, VA, USA, 2015, Abstract.
Xin, Y., Goddard, L. L., Li, X., and Chen, X., "Axial confinement in the monolithic integrated self-rolled-up vertical SiNx microring resonator on a ridge waveguide," presented at the CLEO: Science and Innovations 2016, San Jose, California United States, 2016, SM3G.1, Abstract.

\* cited by examiner

VOLUMETRIC OPTICAL INTEGRATED CIRCUITS

PRIORITY

This application claims priority to U.S. Provisional Patent Application No. 62/776,636, filed Dec. 7, 2018, which is incorporated herein in its entirety. This application also claims priority to U.S. Provisional Patent Application No. 62/784,427, filed Dec. 22, 2018, which is incorporated herein in its entirety. This application also claims priority to U.S. Provisional Patent Application No. 62/944,554, filed Dec. 6, 2019, which is incorporated herein in its entirety.

TECHNICAL FIELD

This disclosure relates to volumetric optical integrated circuits and volumetric optics.

BACKGROUND

Rapid advances in communication technologies, driven by immense customer demand, have resulted in the widespread adoption optical communication media. As one example, many millions of miles of optical fiber provide short and long haul optical communications throughout the world. Improved interconnects, optical processing, and integration with semiconductor based electronics will continue to increase demand.

DETAILED DESCRIPTION

In various systems optical interconnects, e.g., optical elements interfacing one or more optical mediums to one or more other media (including other optical media), utilize specific three-dimensional forms to couple light among the media. Further, for complex and/or multiplexed routing and/or filtering, complex three-dimensional forms may be used. In some cases, processing operations on optical signals may use complex and/or specifically dimensioned forms. In addition, lensing may, in some cases, use two or three dimensional forms of a complex nature (e.g., as opposed to curved lenses or flat uncomplicated forms such as Fresnel lenses) which may be designed through computer modelling or empirical study. Such complex two- or three-dimensional forms may be impractical or impossible to create or to align accurately using standard lens manufacturing techniques alone. Accordingly, techniques and architectures that allow the creation of monolithically integrated optical devices, electro-optical devices, photonic elements, interconnects, waveguides, prisms, and/or other optics of arbitrary dimension, function, and form, such as those discussed below involving writing one or more voxels into a scaffold and/or writing an optic into such a scaffold, offer improvements over existing market based solutions.

In some systems, when writing a form to a medium, lower parts of a form provide support for the upper parts of the form because the writable medium (e.g., a polymer in liquid or aqueous form) provided no physical rigidity unless hardened through exposure. Accordingly, the conventional wisdom was that when constructing via laser writing an optic (e.g., into a polymer medium), the form of the optic should be selected such that the lower portions of the form would support the upper portions. In some cases, the inclusion of a scaffold provides rigidity within the writable medium allowing forms without support from lower portions of the structure, which allows one to proceed with structure selection that may be contrary to the conventional wisdom.

Figure 1:
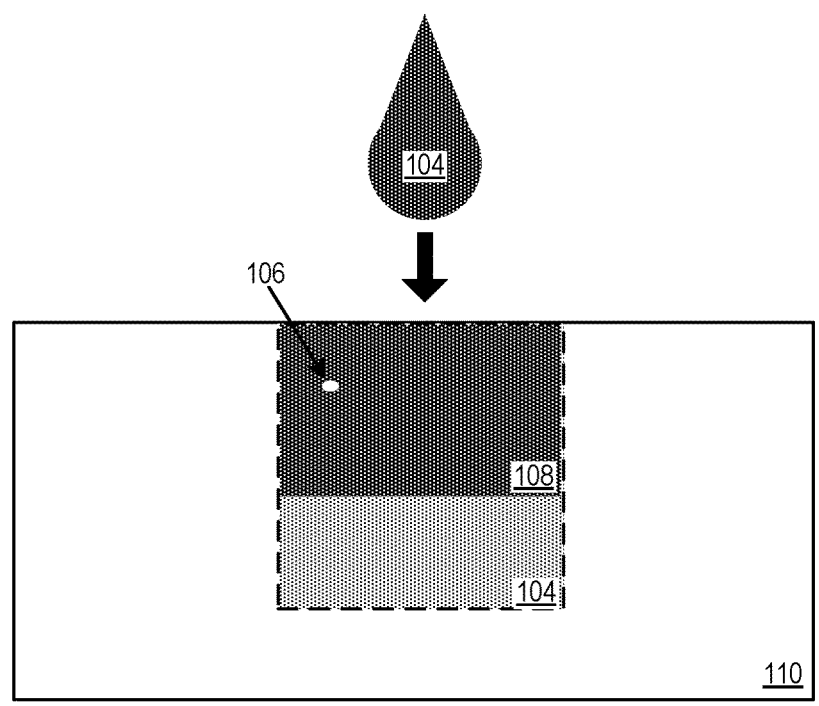
FIG. 1 shows an example volumetric writing system.

FIG. 1 shows an example volumetric writing system 100. The scaffold 102 may be saturated or immersed in writable media 104 to define the writable volume 108. The scaffold 102, which may be porous, may host the writable media and may be transparent both in the presence of the writable media 104 and in cases where the writable media is removed (e.g., after writing is complete or to allow for a second writable media to replace the first for additional writing stages). The writable media 104 may include a writable medium (e.g., a medium for which the refractive index of the medium may change if the medium undergoes a material property change, such as a change that is optically induced or driven. A voxel 106 may be written into the scaffold to create an optic 108. The scaffold 102 may be disposed on a substrate 110 (e.g., a silicon-on-insulator (SOI) compatible substrate, a III-V compatible substrate, or other substrate) which may allow for integration with other optics, electrical devices, and/or other systems. The scaffold may be rigid (e.g., a structure capable of holding written regions in a position in three-dimensional space at least when undisturbed and/or when exposed to ambient conditions). However, in various implementations, the scaffold 102 have varying degrees of flexibility when exposed to particular deforming forces.

Figure 2:
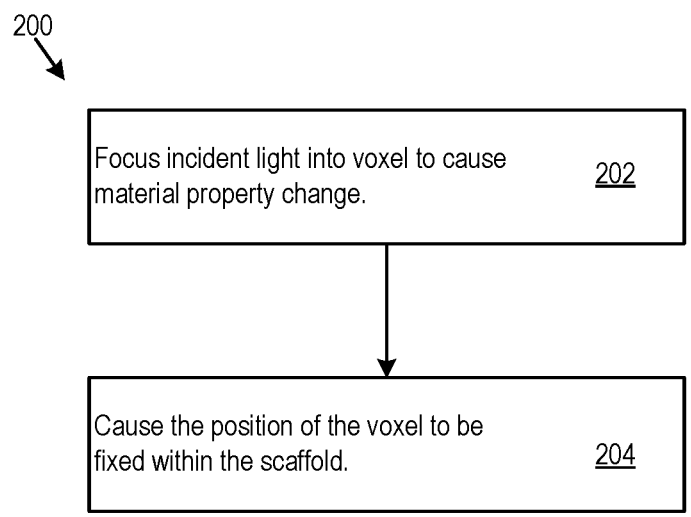
FIG. 2 shows an example technique for writing a voxel into a scaffold.

FIG. 2 shows an example technique 200 for writing a voxel into a scaffold. In the technique, a voxel is generated within a scaffold. The voxel may include a region that has undergone a material property change, such that the optical properties of the region are altered for an operational period (e.g., permanently, for multiple hours/days/months/years, over a decay period, a dissolution period, or other duration over which the written voxel may be used as (at least of portion of) an optic). The voxel may be written by focusing incident light into the voxel to cause the material property change (202). The material property change may include a refractive index change, a density change, a compositional change, a mechanical property change, an electrical property change, an acoustical property change, or other material property change, within a writable medium through optical absorption. Further, the material property change may cause the position of the voxel to be fixed within the scaffold (204). One or more voxels may be used to define an optic within the scaffold.

In other words, optics may be created such that the optics are written into an at least partially optically transparent porous scaffold permeated with a writable medium. The optics may be formed and arranged in a three-dimensional pattern. The optics may include regions having an optically-driven-state-changed writable medium.

The scaffold includes at least a partially rigid region. A writable volume may be included within or overlapping with the at least partially rigid region. The writable volume is defined via a writable medium that at least temporarily permeates the scaffold. The writable medium may include a substance for which an exposure to focused incident light may cause a material property change. In some cases, the optical absorption process may include a linear absorption process. However, in some cases, the optical absorption process includes a non-linear absorption process. For example, the process may include a two-photon, three-photon, and/or multi-photon absorption process. In some cases, use of a non-linear absorption process may allow the site of a voxel to be localized to the area exposed to the focus of a beam. In some cases, higher-order nonlinear absorption processes result in more localization than lower order nonlinear absorption processes. The higher the order of the nonlinear absorption process, the more photons that must be simultaneously absorbed to excite the process. Accordingly, the likelihood of excitation of the process, will increase dramatically (e.g., nonlinearly) near (or at) the focus of a focused incident light source (such as a laser or light emitting diode (LED)). Accordingly, a voxel may include the focal volume (or some portion of the focal volume) of the focused incident light source.

In some cases, the writable volume (e.g., the writable medium therein) may include a monomer, polymer, a photoresist, or a combination thereof. As an illustrative example, pentaerythritol triacrylate may be used. As another illustrative example, writable medium may include a self-assembled-monolayer-forming monomer. In this and other monomer examples, the monomer may form a polymer after cross-linking the monomer as a result of the optical absorption.

As discussed above, the scaffold may include a porous material. In various implementations, the porous material may include porous silicon, porous silicate, porous silica, porous gallium nitride, porous gallium arsenide, porous indium phosphide, porous lithium niobate, other porous III-V materials, porous high-temperature high-silica glass, any porosified nanofabrication substrate porous metallic materials, porous semiconductor materials, and/or porous dielectric materials. The particular scaffold may be selected based on the desired characteristics of the scaffold for a particular application. For example, porous silicon may be selected based on a birefringence of the porous silicon. In an example, the birefringence of the silicon may aid in phase-matching in a multi-wave mixing process.

In various implementations, porous materials that have been porosified via various processes may be used. For example, materials that have been porosified by uniform or non-uniform chemical etching may be used as a scaffold. Materials that have been porosified by uniform or non-uniform physical etching may be used as a scaffold. Materials that have been porosified by uniform or non-uniform electrochemical etching may be used as a scaffold. Material that have been porosified by lithographic etching may be used as a scaffold. Materials that have been porosified by spatially selective etching may be used as a scaffold. Materials that are porous because of deposition at a glancing angle may be used as a scaffold. Materials made porous by assembly or that are porous because of assembly (including self-assembly) may be used as a scaffold. Porous materials, preferably with pores below 1 micron in at least one dimension, or more preferably below 100 nanometers, may be used as a scaffold.

Further, a scaffold may be selected based on transparency constraints of a particular implementation. In various implementations, the transparency of the scaffold allows for exposure of the writable medium to focused incident light. In some cases, opaque scaffolds or scaffolds with limited transparency may prevent (or at least partially inhibit) exposure. Accordingly, a scaffold material may be constructed in various manners (such as any of those discussed above or other porosification processes). However, material selection to meet transparency constraints may be applied (at least in some cases) regardless of the porosification technique employed.

In some implementations, the level/intensity of the material property change may be selected. For example, the exposure may be lessened (reduced in intensity or duration) to reduce the overall change that occurs (e.g., reduce the change in refractive index either up or down). In another example, the exposure may be increased (increased in intensity or duration) to increase the overall change than occurs (e.g., increase the change in refractive index either up or down). Intensity may be increased or decreased by adjusting the input power of the incident light. In some cases, intensity may be increased or decreased by adjusting the focal volume of the incident light.

The light source of the incident light may be a laser, a light emitting diode, a lamp, a flash lamp, an image projector, a fully or partially incoherent light source, and/or a fully or partially coherent light source.

Multiple voxels may be written to the scaffold to define an optic (e.g., see 310 below). In some cases, forms with complex or small-scale features may be created. For example, a waveguide to connect a fiber to a port on an optical chip may be created. In an example, a free space coupler for a fiber or optical chip may be created. In some examples, multiple waveguides may be created within a scaffold. For example, a multiplexor may be created. In an example, a coupler for a multi-channel fiber may be created.

Figure 3:
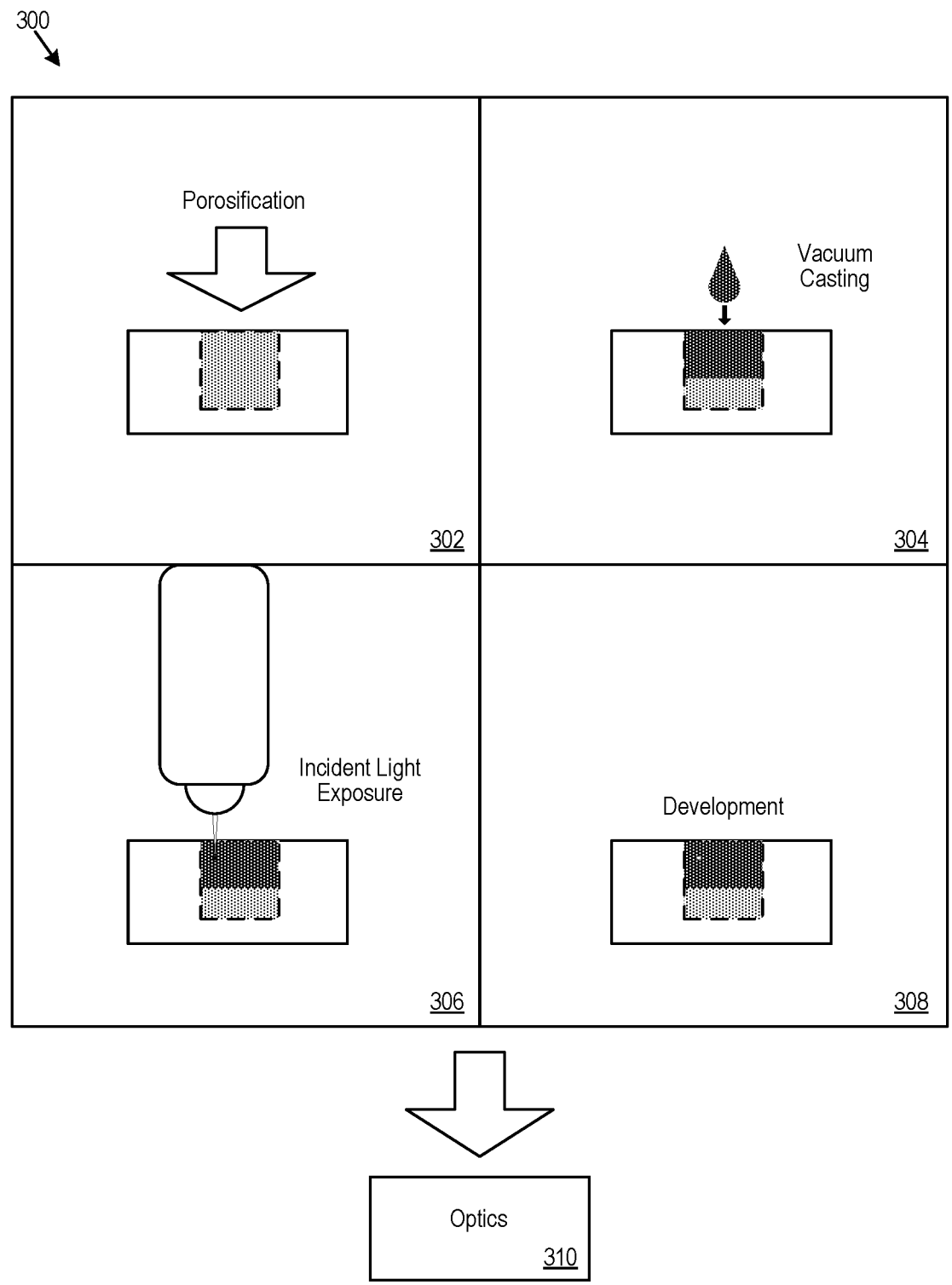
FIG. 3 shows an example technique for preparation of a scaffold and writing to writable media.

FIG. 3 shows an example technique 300 for preparation of a scaffold 102 and writing to writable media 104. A portion of a substrate treated with a porosification process (302) to form the scaffold 102. For example, the substrate may be porosified via one or more of the porosification processes described above. In various implementations, the porosification process may be selected based on the resultant characteristics of the scaffold and/or the conditions present to support the process.

The scaffold may be brought into contact with the writable media in a vacuum casting process (304). The evacuated scaffold may wick the writable media into its pores.

The scaffold/writable media combination is exposed to incident light for writing (306). In some cases, the index contrast between written and non-written regions may be up to 0.4 or more.

The written scaffold/writable media combination may then be developed (308). The development conditions may be determined in accord with the characteristics of the selected writable media and scaffold. The example techniques may produce optics 310.

Example Optics

In an example, a lens 310 may be created (e.g., a plano-convex lens, a bi-convex lens, a parabolic lens, a hyperbolic lens, an elliptical lens, a curved reflector, an aspheric lens, an achromatic lens, a compound lens, a Fresnel lens, a cylindrical lens, an axicon lens, a Luneburg lens, an Eaton lens, a photonic nanojet lens, or other lens type). In some cases, one or more microscope lenses may be created. The microscope lenses may be arranged in an array that may be utilized to view or interact with multiple experimental samples in parallel. For example, the microscope array may be used to monitor a microfluidic system.

In some cases, vector paths may be written into the writable volume in the scaffold. The vector paths may be composed of individual voxels and/or written without individually defined voxels. In some cases, the vector paths may be created by translating the focus of the incident light, e.g., by translating various portions (or the entirety of) the incident light source, steering, and/or focusing apparatus. Additionally or alternatively, such vector paths may be created by translating the sample (e.g., the scaffold including the writable volume).

In some implementations, mechanical translation may be used to create optics of arbitrary dimension and form using raster scan type writing to write one or more two- or three-dimensional layers to the optic using voxels.

In some cases, multiple parallel foci from one or more light sources may be used to write multiple voxels and/or vector paths in parallel.

In various implementations, optics 310 formed using voxels (and/or vector paths) may include functional features. For example, an optic may include layers of differing index (e.g., created by varying exposure of voxel and/or changing the writable material permeating the scaffold when writing the different layers). In an example, the layers may alternate to form a Bragg reflector. In an example, the layers may form a grating (e.g., a diffraction grating, a long period grating, or other grating). An optic written into a scaffold may include a diffraction grating pair. In some illustrative examples, an amplification medium may be disposed between the grating pair.

In an example, the optic 310 may include a mask. In an example, the mask may be partially opaque. In an example, the mask may be partially diffractive. In an example, the mask may include a spatial filter, a spectral filter, or both. In an example, the mask may impart relative phase shifts on light traveling through the optic. In an example, the mask may be a part of a 4-f system and the optic may further include two lenses. In an example, inputs and outputs to the 4-f system may include diffraction gratings. The gratings may be a distance f from the lenses which are each placed a distance f from the mask on opposite sides. The distance f corresponds to the focal length of the lenses.

In an example, the optic 310 may include an output-defined device. For example, the voxels (or other index-altered regions) may be written based on a simulation that accepts a desired output intensity distribution and/or an illumination distribution as inputs to determine the spatial refractive index distribution of the regions that produces the desired output intensity. For example, the written optic may include a complex index distribution that results in a spot focus or a collimated beam (e.g., the optic is a lens). In an example, the desired output distribution may be one that varies with the optical properties of an input such that the optic can be used in input light characterization. For example, the desired output may be an image that varies responsive to amplitude, phase, wavelength, polarization, propagation direction, or other property of the input electric field distribution of the input.

Figure 4:
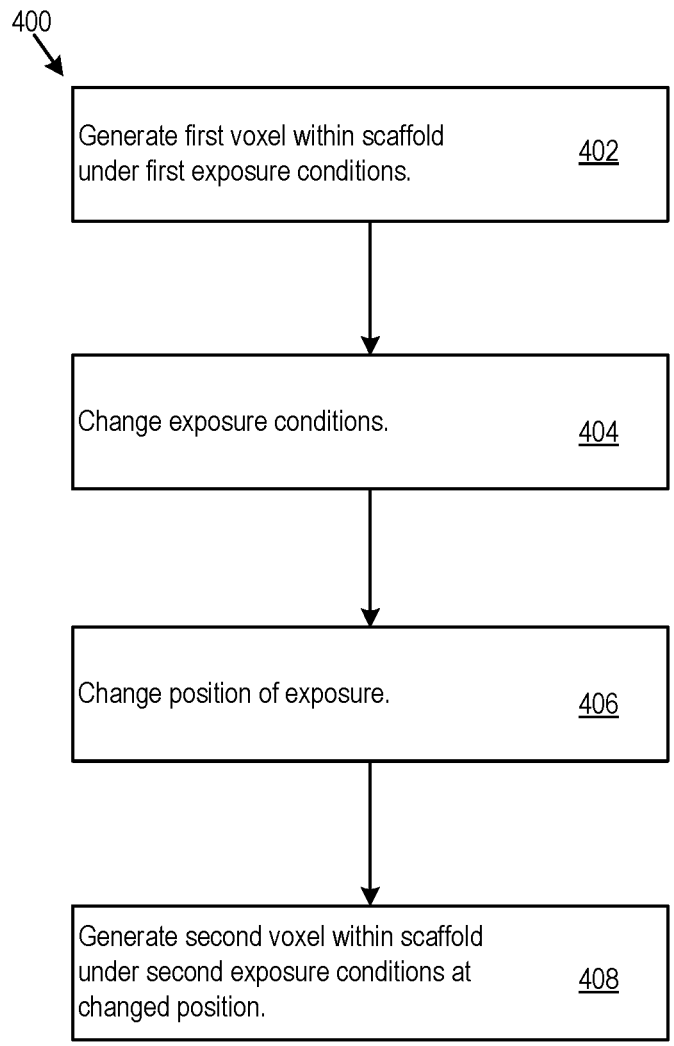
FIG. 4 shows an example technique for fabricating optics having regions of differing refractive index.

In an example, the optic 310 may include a graded index (GRIN) optic or other optics having regions of differing refractive index. FIG. 4 shows an example technique 400 for fabricating a GRIN optic or other optics having regions of differing refractive index. A first voxel characterized by first exposure conditions may be generated within the scaffold (402). For example, the exposure conditions may include duration of exposure, intensity of exposure, type of writable medium, or other factors that may be changed to alter the index of the voxel that is created. After the first voxel is generated, the exposure conditions may be changed (404). The position of exposure within the scaffold is changed (406). A second voxel is generated at the new position under the changed exposure conditions, such that the second voxel has a different refractive index than the first (408).

In some implementations, GRIN optics 310 or other optics having regions of different refractive index may be created via vector path writing where the exposure conditions (in some cases, including speed of travel along the vector path) are altered as the writing system travels along the vector path. In a GRIN optic example, the first and second voxels may define the ends of a vector path. In the example, the GRIN optic (such as a GRIN lens or other GRIN optic) may be fabricated in part by varying the written index continuously/gradually (or in discrete steps) in voxels written on the vector path between the first and second voxels. Additionally or alternatively, step-index optics may similarly be created by varying the index abruptly along the vector path (e.g., the first and second voxels being placed side-by-side, or otherwise close proximity in view of the minimum scale for written features of the system).

In some implementations, other optics 310 having regions of different refractive index may be created by creating voxels and/or vector paths with different/changing refractive index. For example, waveguides (e.g., with core and cladding indices or multiple index layers may be created).

In an example, the optics 310 may include porous silicon optics. For example, the optic may include porous silicon micropillars with polarization dependent focusing. The optic may include porous silicon micropillars forming a distributed Bragg reflector, in some cases, including an atomic layer deposition of $TiO_2$ with the pores. The optic may include a porous silicon waveguide (e.g., for use in biosensing and/or nonlinear wave mixing).

In an example, the optic 310 may include optics written for different electromagnetic spectra. For example ultraviolet (UV), visible (VIS), or infrared (IR) optics may be created.

In an example, the optic 310 may include an optical interposer. For example, a fiber array to three-dimensional waveguide layouts in collinear, coplanar, and hybrid collinear and coplanar modes.

In an example, the optic 310 may be integrated with field-effect transistors and/or gate-all-around nanowire devices. For example, the integration with electric devices allows for the creation of electro-optic devices supporting electrically controlled optical gating and/or high-bandwidth optically-driven switching operations.

In an example, the optic 310 may include 90-degree couplers for chip-based applications. For example, such couplers may allow vertical coupling from fibers to in-plane on-chip waveguides.

In an example, the optic 310 may include a resonator. For example, the optic may include a toroidal, racetrack, disk, rectangular, or spherical resonator.

Various implementations have been specifically described. However, many other implementations are also possible. For example, the optics 310 may include any one or any combination of the various ones of the example optics and/or photonic elements described in U.S. Provisional Patent No. 62/776,636, filed Dec. 7, 2018, which was previously incorporated by reference. The optics 310 may include any one or any combination of the various ones of the example optics and/or photonic elements described in U.S. Provisional Patent No. 62/784,427, filed Dec. 22, 2018, which was previously incorporated by reference. The optics may include any one or any combination of the various ones of the example optics 310 and/or photonic elements described in U.S. Provisional Patent No. 62/944,554, filed Dec. 6, 2019, which was previously incorporated by reference. The optics may be fabricated using any technique or apparatus described in U.S. Provisional Patent No. 62/776, 636, U.S. Provisional Patent No. 62/784,427, and/or U.S. Provisional Patent No. 62/944,554. The example implementations included by reference via the above referenced provisional applications are described to be illustrative of various ones of the principles discussed above. However, the examples included within the above referenced provisional applications are not intended to be limiting, but rather, in some cases, specific examples to aid in the illustration of the above described techniques and architectures. The features of the above referenced provisional applications may be combined in various groupings in accord with the techniques and architectures described above.

A1 In an example, a device includes: an at least partially rigid scaffold including a writable volume, the writable volume defined via a writable medium that at least temporarily permeated the scaffold; and a voxel fixed within the writable volume by the scaffold, the voxel written in the writable medium via optical absorption.

A2 The device of example A1, where the writable medium includes a monomer, polymer, and/or a photoresist.

A3 A device in accord with any of the devices of any of the preceding examples, where the photoresist includes pentaerythritol triacrylate.

A4 A device in accord with any of the devices of any of the preceding examples, where the monomer includes a self-assembled-monolayer-forming group.

A5 A device in accord with any of the devices of any of the preceding examples, where the voxel includes a polymer after cross-linking the monomer as a result of the optical absorption.

A6 A device in accord with any of the devices of any of the preceding examples, where the optical absorption includes multi-photon absorption.

A7 A device in accord with any of the devices of any of the preceding examples, where the multi-photon photon absorption includes two-photon absorption.

A8 A device in accord with any of the devices of any of the preceding examples, where a voxel volume of the voxel includes a focal volume of a focused incident light source.

A9 A device in accord with any of the devices of any of the preceding examples, where the scaffold includes a porous structure.

A10 A device in accord with any of the devices of any of the preceding examples, where the porous structure includes a porous silicon, porous silicate, porous silica, porous gallium nitride, porous gallium arsenide, porous indium phosphide, porous lithium niobate, other porous III-V materials, porous high-temperature high-silica glass, any porosified nanofabrication substrate, porous metallic materials, porous dielectric materials, porous semiconductor materials any material that has been porosified by uniform or non-uniform chemical etching, any material that has been porosified by uniform or non-uniform physical etching, any material that has been porosified by uniform or non-uniform electrochemical etching, any material that has been porosified by lithographic etching, any material that has been porosified by spatially selective etching, any material that is porous because of deposition at a glancing angle, any material made porous by assembly or that is porous because of assembly (including self-assembly), any porous material, preferably with pores below 1 micron in at least one dimension, or more preferably below 100 nanometers below, or any combination thereof.

B1 In an example, a method of manufacture includes: in a writable volume within an at least partially rigid scaffold: generating a voxel by: focusing incident light into the voxel to cause a material property change, such as an index change, a density change, a compositional change, a mechanical property change, an electrical property change, an acoustical property change, or other material property change, within a writable medium through optical absorption; while causing the material property change, fixing a position of the voxel within the scaffold; and optionally, the method is used to fabricate any of the devices from any of the preceding examples.

B2 A method in accord with the method of B1, further including selecting a level of the material property change by selecting an intensity or exposure duration of the incident light.

B3 A method in accord with any of the methods of any of the preceding examples, where selecting the intensity includes selecting a power output of a light source of the incident light.

B4 A method in accord with any of the methods of any of the preceding examples, where selecting the intensity of the incident light includes selecting a focal volume of the incident light.

B5 A method in accord with any of the methods of any of the preceding examples, a light source of the incident light includes a laser, a light emitting diode, a lamp, a flash lamp, an image projector, a fully or partially incoherent light source, a fully or partially coherent light source, or any combination thereof.

B6 A method in accord with any of the methods of any of the preceding examples, further including generating multiple voxels to define an optic within the scaffold.

B7 A method in accord with any of the methods of any of the preceding examples, where the optic includes a waveguide configured to connect a guided mode from a fiber or an optical beam propagating in free space to a port on an optical chip.

B8 A method in accord with any of the methods of any of the preceding examples, where the waveguide is one of multiple waveguides within the scaffold.

B9 A method in accord with any of the methods of any of the preceding examples, where the fiber includes a multi-channel fiber.

B10 A method in accord with any of the methods of any of the preceding examples, further including fabricating the scaffold on a silicon on insulator platform.

B11 A method in accord with any of the methods of any of the preceding examples, further including fabricating the scaffold on a III-V compatible platform.

C1 In an example, a device includes: an at least partially optically transparent scaffold; and an optic, suspended within the scaffold, the optic including regions having undergone an optically-driven state change to a writable medium that permeated the scaffold at a time of the optically-driven state change; and optionally, the device is fabricated using any of the methods of any of the preceding examples.

C2 A device in accord with any of the devices of any of the preceding examples, where the regions include vector paths having undergone the optically-driven state change.

C3 A device in accord with any of the devices of any of the preceding examples, where the vector paths are defined by the mechanical translation of the sample, and/or by the mechanical translation or the angular deflection of a focal volume of light incident on the writable medium at the time of the optically-driven state change.

C4 A device in accord with any of the devices of any of the preceding examples, where the vector path defines a continuous region without defined individual voxels.

C5 A device in accord with any of the devices of any of the preceding examples, where the regions include a multiple optically-written voxels.

C6 A device in accord with any of the devices of any of the preceding examples, where the multiple optically-written voxels include multiple voxels written in parallel.

C7 A device in accord with any of the devices of any of the preceding examples, where the multiple optically-written voxels include multiple voxels written in a raster scan.

C8 A device in accord with any of the devices of any of the preceding examples, where the raster scan includes multiple stacked two-dimensional scan layers defining a three-dimensional volume.

C9 A device in accord with any of the devices of any of the preceding examples, where the multiple optically-written voxels include multiple voxels written in a defined vector path.

C10 A device in accord with any of the devices of any of the preceding examples, where the optic includes a microscope lens.

C11 A device in accord with any of the devices of any of the preceding examples, where the microscope lens is one of multiple microscope lenses within a microscope array embedded within the scaffold.

C12 A device in accord with any of the devices of any of the preceding examples, where the microscope array is implemented for monitoring of a microfluidic system.

C13 A device in accord with any of the devices of any of the preceding examples, wherein the microscope array is implemented for monitoring of an array of sample wells.

C14 A device in accord with any of the devices of any of the preceding examples, where the optic includes multiple differing index layers.

C15 A device in accord with any of the devices of any of the preceding examples, where the optic includes a Bragg reflector.

C16 A device in accord with any of the devices of any of the preceding examples, where the optic includes a first grating.

C17 A device in accord with any of the devices of any of the preceding examples, further including a second gating.

C18 A device in accord with any of the devices of any of the preceding examples, further including an amplifier medium between the first grating and the second grating.

C19 A device in accord with any of the devices of any of the preceding examples, where the first grating includes a diffraction grating.

C20 A device in accord with any of the devices of any of the preceding examples, where the first grating includes a long period grating.

C21 A device in accord with any of the devices of any of the preceding examples, where optic includes a mask.

C22 A device in accord with any of the devices of any of the preceding examples, further including: a first lens spaced away from the mask by a focal length; and a second lens spaced opposite the first lens relative to the mask, the second lens spaced away from the mask by the focal length.

C23 A device in accord with any of the devices of any of the preceding examples, further including: an input spaced opposite the mask relative to the first lens, the input spaced away from the first lens by the focal length; and an output spaced opposite the mask relative to the second lens, the output spaced away from the second lens by the focal length.

C24 A device in accord with any of the devices of any of the preceding examples, where the first input, the output, or both include diffraction gratings.

C25 A device in accord with any of the devices of any of the preceding examples, where the focal length corresponds to the focal length of the first and second lenses.

C26 A device in accord with any of the devices of any of the preceding examples, where the mask includes a spatial filter, a spectral filter, or both.

C27 A device in accord with any of the devices of any of the preceding examples, where the optic includes a parabolic lens, a Fresnel lens, a cylindrical lens, an axicon lens, a Luneburg lens, an Eaton lens, a photonic nanojet lens, or any combination thereof.

C28 A device in accord with any of the devices of any of the preceding examples, where the regions are generated according to a simulation that accepts a desired output intensity distribution and/or an illumination distribution as inputs to determine the spatial refractive index distribution of the regions that produces the desired output intensity or an approximation thereof.

C29 A device in accord with any of the devices of any of the preceding examples, where: the desired output intensity distribution includes a spot focus; and/or the desired output intensity distribution includes an image containing information about the amplitude, phase, wavelength, polarization, propagation direction, or other property of the input electric field distribution of the illumination.

D1 In an example, a method of manufacture includes: generating a graded index optic in a writable medium permeating a scaffold by: affixing a first voxel within the scaffold by exposing a first region of the writable medium to incident light of a first intensity to produce an index shift of a first level in the writable medium; affixing a second voxel within the scaffold by exposing a second region of the writable medium to incident light of a second intensity to produce an index shift of a second level in the writable medium; and optionally, the method is used to fabricate any of the devices from any of the preceding examples.

D2 A method in accord with any of the methods of any of the preceding examples, where: the second region is different from the first region; the second intensity is different from the first intensity; and the second level is different from the first level.

E1 In an example, a device includes: a graded index optic embedded within a porous scaffold, the graded index optic including: an optically-written first voxel fixed within the porous scaffold, the first voxel characterized by a first index; an optically-written second voxel fixed within the porous scaffold, the second voxel characterized by a second index; an optical gradient formed over a path between the first and second voxels, the optical gradient characterized by the first and second indices; and optionally, the device is fabricated using any of the methods of any of the preceding examples.

E2 A device in accord with any of the devices of any of the preceding examples, where the first voxel and second voxel form part of a waveguide.

E3 A device in accord with any of the devices of any of the preceding examples, where the optical gradient includes a transition from a core index of a core of the waveguide to a cladding index of the cladding of the waveguide.

E4 A device in accord with any of the devices of any of the preceding examples, where the transition includes a gradual transition over the width of multiple voxels.

E5 A device in accord with any of the devices of any of the preceding examples, where the graded index optic includes a graded index lens.

E6 A device in accord with any of the devices of any of the preceding examples, where the transition includes an abrupt step transition between a pair of adjacent voxels.

E7 A device in accord with any of the devices of any of the preceding examples, where the scaffold includes porous silicon and a birefringence of the porous silicon is configured to aid in an optical process.

E8 A device in accord with any of the devices of any of the preceding examples, where the optical process comprises phase matching in a multi-wave mixing process.

F1 In an example, a device includes: an at least partially optically transparent porous scaffold permeated with a writable medium; and optics written within the scaffold in a three-dimensional pattern, the optics including regions comprising optically-driven state changed writable medium; optionally, the device includes any of the features of any of the devices of the preceding examples; and optionally, the device is fabricated using any of the methods of any of the preceding examples.

G1 In an example, a product includes a device resulting from implementation of any of the methods of any of the preceding examples.

H1 In an example, method of manufacture includes generating any of the devices of any of the preceding examples.

In an example, device includes virtually any index distribution in an at least partially rigid scaffold permeated with a writable medium generated via voxel-by-voxel writing, vector writing, raster scan writing, or any combination thereof.

J1 In an example, method of manufacture includes generating virtually any index distribution in an at least partially rigid scaffold permeated with a writable medium using voxel-by-voxel writing, vector writing, raster scan writing, or any combination thereof.

K1 In an example, device includes any of the features or any combination of the features in the preceding disclosure.

L1 In an example, method includes implementing any of the features or any combination of the features in the preceding disclosure.

Headings and/or subheadings used herein or in the above referenced provisional applications are intended only to aid the reader with understanding described implementations.

What is claimed is:

1. A device comprising:
   a porous medium comprising a writable volume, the writable volume defined via a writable medium that at least temporarily permeated pores of the porous medium; and
   a voxel formed within the writable volume via optical absorption by the writable medium.

2. The device of claim 1, where the writable medium includes a monomer, polymer, a photoresist, or any combination thereof.

3. The device of claim 2, where the photoresist includes pentaerythritol triacrylate.

4. The device of claim 2, where the monomer includes a self-assembled-monolayer-forming group.

5. The device of claim 2, where the voxel includes a polymer after polymerizing the monomer as a result of the optical absorption.

6. The device of claim 1, where the optical absorption includes multi-photon absorption.

7. The device of claim 1, where a voxel volume of the voxel includes a focal volume of a focused incident light source.

8. The device of claim 1, where the porous medium comprises a porous silicon.

9. The device of claim 1, where the porous medium is a porous silicon that has been at least partially oxidized.

10. A method of manufacture including:
    generating a porous medium with a writable volume by porosifying at least a portion of a substrate; and
    in the writable volume within the porous medium that at least temporarily permeated pores of the porous medium, generating a voxel by:
       focusing incident light into the writable volume to cause a material property change within a writable medium through optical absorption; and
       while causing the material property change, fixing a position of the voxel within the porous mediums.

11. The method of claim 10, further including selecting a level of the material property change by selecting an intensity or exposure duration of the incident light.

12. The method of claim 11, where selecting the intensity includes selecting a power level of a light source of the incident light.

13. The method of claim 11, where selecting the intensity of the incident light includes selecting a focal volume of the incident light.

14. The method of claim 10, a light source of the incident light includes a laser, a light emitting diode, a lamp, a flash lamp, an image projector, or any combination thereof.

15. The method of claim 10, further including generating multiple voxels to define an optic within the porous medium.

16. The method of claim 15, where the optic includes a waveguide configured to connect a guided mode from a fiber to a port on an optical chip.

17. The method of claim 16, where the waveguide is one of multiple waveguides within the porous medium.

18. The method of claim 16, where the fiber includes a multi-channel fiber.

19. A method including:
    generating a porous medium including a writable volume by porosifying at least a portion of a substrate;
    focusing incident light into the porous medium including the writable volume, the writable volume defined via a writable medium that at least temporarily permeates pores of the porous medium; and
    writing, via optical absorption of the incident light, a voxel in the writable medium within the writable volume in the porous medium.

20. The method of claim 19, where:
    writable medium includes a monomer; and
    the voxel includes a polymer formed after polymerizing the monomer as a result of the optical absorption.

* * * * *

UNITED STATES PATENT AND TRADEMARK OFFICE
CERTIFICATE OF CORRECTION

PATENT NO. : 11,237,343 B2
APPLICATION NO. : 16/706173
DATED : February 1, 2022
INVENTOR(S) : Lynford L. Goddard et al.

It is certified that error appears in the above-identified patent and that said Letters Patent is hereby corrected as shown below:

In the Claims

Column 12, Claim 10, Line 18, delete "mediums." and replace with --medium.--.

Signed and Sealed this
Nineteenth Day of April, 2022

Katherine Kelly Vidal
*Director of the United States Patent and Trademark Office*